Sept. 6, 1932.  J. ECKHARD  1,875,860
FLUID SHOCK ABSORBER
Filed Aug. 29, 1930   2 Sheets-Sheet 1

Inventor
John Eckhard
By Murray Hnd Zugelter
Attorneys

Sept. 6, 1932.  J. ECKHARD  1,875,860
FLUID SHOCK ABSORBER
Filed Aug. 29, 1930  2 Sheets-Sheet 2
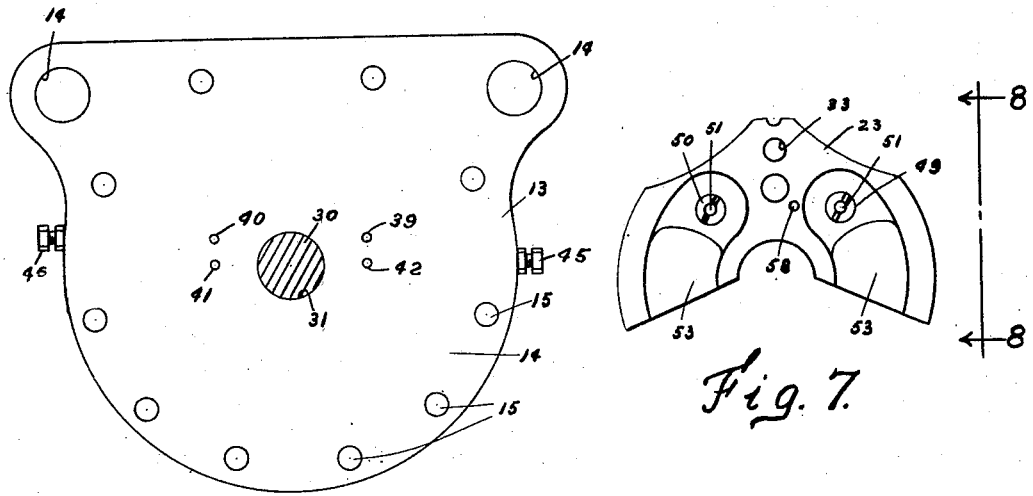
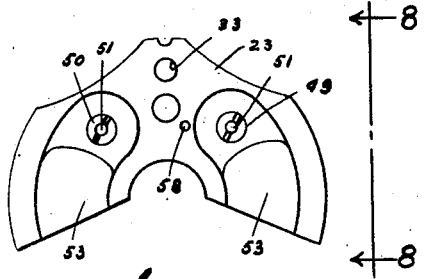
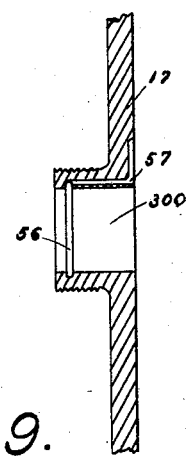
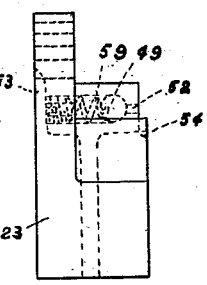
Inventor
John Eckhard
By Murray and Zugelter
Attorneys Patented Sept. 6, 1932

1,875,860

UNITED STATES PATENT OFFICE

JOHN ECKHARD, OF CINCINNATI, OHIO

FLUID SHOCK ABSORBER

Application filed August 29, 1930. Serial No. 478,647.

This invention relates to improvements in a fluid shock absorber such as may be employed on various types of vehicles.

An object of the invention is to provide an improved fluid shock absorber wherein is eliminated the lost motion due to frothing or foaming of the fluid when the device is in operation.

Another object is to provide a fluid shock absorber with means for precluding the formation of a vacuum and of air pockets in the piston chamber thereof when the piston is actuated, thereby precluding also foaming or frothing of the fluid, which conditions would result in rendering the device vacuum bound, air bound or foam bound.

Another object is to provide a shock absorber with means for the above purpose, which is simple and inexpensive to manufacture.

Another object is to provide means in a shock absorber whereby the piston chamber thereof is automatically replenished with fluid from a normally non-communicating reservoir, by the action of the piston.

Another object is to provide an improved arrangement of safety valves for precluding bursting of the device when subjected to excessive shock.

Another object is to provide a readily adjustable means whereby movement of the piston in two directions may be independently controlled and whereby the device may instantly be adapted for use on opposite sides of a vehicle, without disassembly.

These and other objects are attained by the means described herein and disclosed in the accompanying drawings, in which:

Fig. 6 is a cross-sectional view taken on line 6—6 of Fig. 3.

Fig. 7 is a rear elevational view of a dividing plate shown in front elevation in Fig. 4.

Fig. 8 is a side view of the dividing plate taken on line 8—8 of Fig. 7.

Fig. 9 is a cross-sectional view taken through the piston shaft bearing of the shock absorber.

Figure 1:
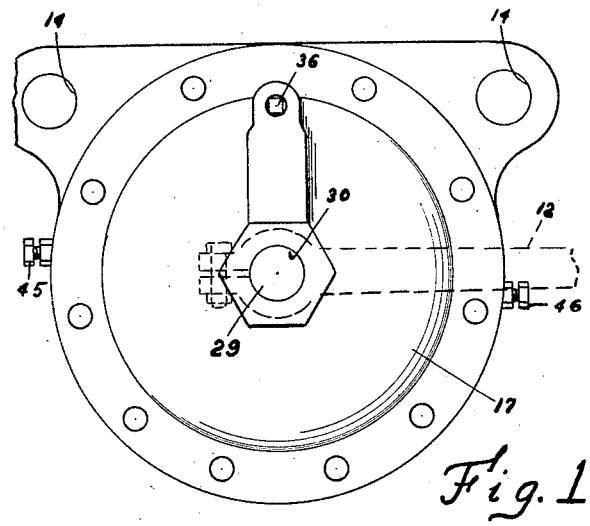
Fig. 1 is a front elevational view of the device of the invention.
Figure 3:
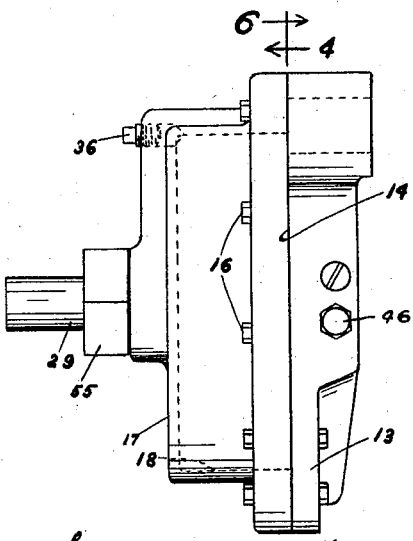
Fig. 3 is a side view of the device of the invention.

One of the important objects of the present invention is to render a shock absorber of the herein disclosed type smoother in operation by eliminating the formation of froth or air bubbles which, in the ordinary fluid shock absorber, result from the violent intermixing of the shock absorber fluid and air which finds its way into the piston chamber during operation of the device. The presence of readily compressible air or froth in the piston chamber of a shock absorber designed for fluid operation only, permits comparatively unretarded movement of the piston during a portion of its stroke, wherefore, this portion of the stroke cannot be of use in absorbing shock transmitted to the piston by the arm 12, which is operatively connected with either the spring or the axle of a vehicle, as is well known. The shock absorber becomes air bound or foam bound when air is present for the piston to work on, and vacuum bound when there is insufficient fluid on one side of the piston. These conditions are eliminated by providing the means about to be described.

The shock absorber casing comprises the base plate 13 which is provided with means such as perforations 14 whereby the base plate may be secured to the frame or other stationary part of a vehicle. The base plate has a perfectly flat interior surface 14 provided with a series of perforations 15 arranged in a circle, for the reception of bolts 16 which secure the cylindrical piston housing member 17 upon the base plate. Said housing member is provided with a depression or cylinder 18, forming a piston chamber, having a curved inner wall 19 for cooperation with the piston 20. The end of the piston has sliding contact upon the curved wall 19 of the piston chamber. At 21 is indicated a machined flange in which are formed threaded perforations 22 cooperating with the bolts 16 for securing the piston housing member upon the flat face of the base plate 13.

The housing member 17 is divided, by means of a dividing wall plate 23, to provide the piston chamber 18 and a fluid reservoir 24. The continuous dividing wall 25, which extends from the flat inner wall 26 of the piston housing member to the flat face 14 of the base plate, has a mid portion 27 which provides a bearing for the hub 28 of the piston. The piston shaft 29 extends through a piston shaft bearing 300 located centrally of the housing member 17 and an extension 30 of said shaft is received in a depression or bearing 31 of the base plate. From the foregoing it should be apparent that by actuating the arm 12, the piston may be moved within the piston chamber to an extent limited by the dividing wall of the plate 23. The dividing wall of plate 23 is precluded from relative movement within the housing member 17, by a dowel pin 32 extending inwardly from the face 26 and received in a perforation 33 of the dividing plate. The plate may be further precluded from relative movement by providing a bolt 34 passing through and engaging a threaded bore 35 in the material of the housing member. At 36 is represented a filler opening plug which may be removed for replenishing the supply of fluid in the reservoir of the piston chamber.

Figure 2:
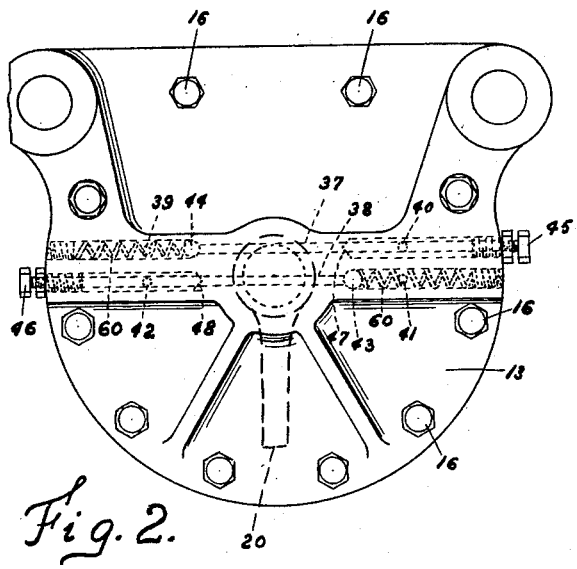
Fig. 2 is a rear elevational view of the device shown in Fig. 1.
Figure 4:
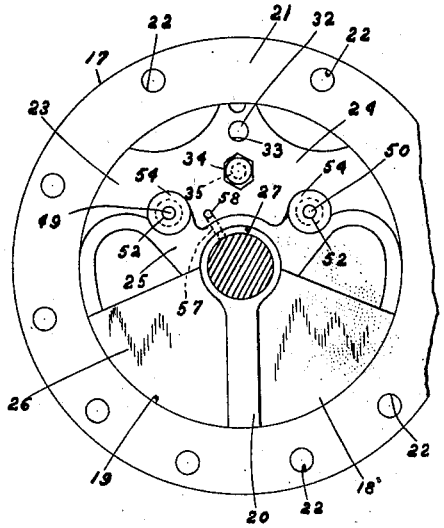
Fig. 4 is a cross-sectional view taken on line 4—4 of Fig. 3.
Figure 5:
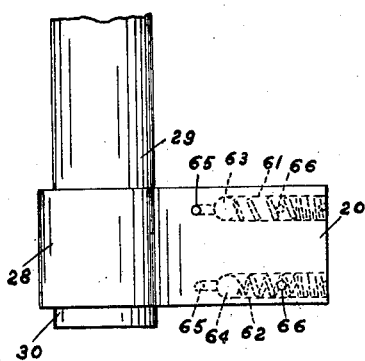
Fig. 5 is an enlarged elevational view of the shock absorber piston.

In the absence of air in the piston chamber, the shock absorber fluid is forced from one side of the piston to the other, through a pair of constricted fluid passages 37 and 38 each of which is provided with a one-way check valve and a needle valve for limiting flow of fluid through the check valve and its cooperative passage. The bores of the passages extend in parallelism diametrically of the base plate, and they are so located with respect to the dividing plate wall that each may communicate with the piston chamber on the opposite sides of the piston. Passage 37 communicates with the piston chamber by means of a fluid passage inlet 39 and a fluid passage outlet 40 disposed on opposite sides of the piston. Fluid passage 38 has a communicating fluid passage inlet 41 and a fluid passage outlet 42 communicating with the piston chamber on opposite sides of the piston. It should be noted that the fluid passage outlet of one fluid passage communicates with the piston chamber at the same side of the piston with which the fluid passage inlet of the second fluid passage is in communication. It should be clear from the disclosure in Fig. 2, therefore, that upon movement of the piston plate 20 toward the right, fluid will be forced through the outlet 40 and passage 37 to be discharged from the inlet 39 to the opposite side of the piston. This displacement of fluid through the opening 41 is precluded by the ball check valve 43 in passage 38. Likewise, when the piston plate is moved to the left, the ball check valve 44 will preclude movement of fluid through passage 37 while the ball check valve 43 will be unseated by passage of fluid into passage 28 through the outlet 42. The amount of fluid that may move through the passages may be controlled by needle valves 45 and 46 or the like, which seat at 47 and 48, respectively. In each of the passages 37 and 38, a needle valve seat and a ball check valve are located between the inlet and outlet ports.

It is of importance that the size of the passages 37 and 38 be no larger than is necessary to convey the maximum amount of fluid passing therethrough under ordinary conditions. By having these passages small or constricted, there is effected a great reduction in the agitating of the fluid during operation of the device. It should be noted that these passages provide the only means whereby fluid may pass from one side of the piston to the other, there being no means whereby fluid may pass from the piston chamber to the reservoir, which latter usually contains a quantity of air.

The valves indicated at 49 and 50 are ball checks or other suitable one-way valves whereby fluid may be taken from the reservoir but not returned thereto. From the disclosure in Figs. 7 and 8, it will be apparent that the drilled plugs 51 provide for passage of fluid through the opening 52, the spring urged ball being provided to check passage of fluid from the piston chamber into the reservoir. The depressions 54 and 53 in the rear and front faces, respectively, of the dividing wall plate, communicate with the piston chamber and reservoir, respectively. From the foregoing it should be apparent that fluid leaking from the piston chamber along the piston shaft, will be replaced by fluid sucking from the reservoir through the valves 49 and 50. Means are provided for returning to the reservoir, that fluid which is forced outwardly toward the packing nut 55 by reason of the high pressure developed within the piston chamber. Said means comprises an annular groove 56 formed in the bearing 30, which groove communicates, by means of a passage 57, with an opening 58 formed in the portion of the dividing wall plate that forms part of the reservoir. The fluid that is returned to the reservoir through these passages, is sucked into the piston chamber, through the valves 49 and 50, by the action of the piston. It is to be understood that other means of returning the leakage to the reservoir may be employed. The compression springs in the valves 49 and 50 are indicated by 59, and the compression springs for the ball check valves 43 and 44 are indicated at 60. Means for precluding bursting of the device when subjected to severe shock, is located in the piston itself. Said means comprises a pair of bores 61 and 62 each of which contains a spring urged ball valve, indicated at 63 and 64, which control passage of fluid from one side of the piston to the other, through the inlet openings 65 and the outlet openings 66. It should be noted that each side of the piston has an outlet opening and an inlet opening and that by overcoming the resistance offered by the spring urged check valves, fluid may pass through the piston from one side of the piston chamber to the other. The valves are so arranged that they will remain closed under ordinary conditions, but may be opened in the event that the piston is subjected to severe or extreme movement in either direction of piston movement. These valves, therefore, are normally inoperative.

When in use, the needle valves 45 and 46 ordinarily are adjusted to permit different amounts of fluid passage whereby to effectively absorb shock due to both the compression and rebound of a vehicle spring. In order to make use of a shock absorber previously installed on one side of a vehicle, it usually is necessary to change the adjustment of the needle valves so that the amount of fluid that had passed through passage 37, for example, will pass through passage 38, and that the amount that previously had passed through passage 38 will pass through passage 37. This change in adjustment requires no removal or replacement of parts, it being necessary merely to apply a tool to the heads of the needle valves and adjust them to provide the proper size of opening.

It is to be understood that various modifications and changes in structural details of the device may be made within the scope of the appended claims, without departing from the spirit of the invention.

What is claimed is:

1. In a device of the class described the combination of a movable piston and a divided housing therefor providing a reservoir and a piston chamber in which the piston may move, the piston serving to divide the piston chamber, a pair of fluid replenishing valves each normally yieldingly seated and adapted for communicating with the reservoir, one of the valves being in communication with the piston chamber at one side of the piston and the other being in communication with the piston chamber at the other side of the piston, said valves being arranged to preclude passage of fluid from the piston chamber to the reservoir but to yield and open by suction of the piston to permit passage of small amounts of fluid from the reservoir to the piston chamber to compensate for fluid leakage from the piston chamber, and independent passage means each normally serving to convey fluid from one side of the piston to the other upon movement of the piston the passages each including a check valve and a second valve for fixed adjustment.

2. In a device of the class described the combination of a movable piston and a divided housing therefor providing a reservoir and a piston chamber in which the piston may move, the piston serving to divide the piston chamber, a pair of fluid replenishing valves each normally yieldingly seated and adapted for communicating with the reservoir, one of the valves being in communication with the piston chamber at one side of the piston and the other being in communication with the piston chamber at the other side of the piston, said valves being arranged to preclude passage of fluid from the piston chamber to the reservoir but to yield and open by suction of the piston to permit passage of small amounts of fluid from the reservoir to the piston chamber, a fixed valve controlled one-way passage means for the conveyance of fluid from one side of the piston to the other, and a second fixed valve controlled one-way passage means entirely independent of the first one way passage means for conveying fluid, in the opposite direction, from one side of the piston to the other.

3. In a device of the class described the combination of a movable piston and a divided housing therefor providing a reservoir and a piston chamber in which the piston may move, the piston serving to divide the piston chamber, a pair of fluid replenishing valves each communicating with the reservoir, one of the valves being in communication with the piston chamber at one side of the piston and the other being in communication with the piston chamber at the other side of the piston, said valves being arranged to preclude passage of fluid from the piston chamber to the reservoir but to permit passage thereof from the reservoir to the piston chamber in small amounts equal to normal leakage from the device, a one-way passage means, including a check valve for the conveyance of fluid from one side of the piston to the other, a second one-way passage means entirely independent of the first one way passage means and including a check valve for conveying fluid, in the opposite direction, from one side of the piston to the other, and a regulating valve in each passage means and capable of fixed adjustment, for controlling the rate of fluid passage therethrough.

4. In a device of the class described the combination of a movable piston and a divided housing therefor providing a reservoir and a piston chamber in which the piston may move, the piston serving to divide the piston chamber, a pair of fluid replenishing valves each normally yieldingly seated and adapted for communicating with the reservoir, one of the valves being in communication with the piston chamber at one side of the piston and the other being in communication with the piston chamber at the other side of the piston, said valves being arranged to preclude passage of fluid from the piston chamber to the reservoir but to yield and open by suction of the piston to permit passage of small amounts of fluid from the reservoir to the piston chamber, a one-way passage means for the conveyance of fluid from one side of the piston to the other, a second one-way passage means entirely independent of the first one way passage means for conveying fluid, in the opposite direction, from one side of the piston to the other, a valve in each passage means capable of fixed adjustment for controlling the rate of fluid passage therethrough, a check valve in each of said passage means, and normally inoperative means for relieving excessive pressure that may be built up on either side of the piston.

5. In a device of the class described the combination of a movable piston having a shaft and a divided housing for the piston providing a reservoir and a piston chamber in which the piston may move, the piston serving to divide the piston chamber, a bearing in the housing, a pair of fluid replenishing valves each normally yieldingly seated and adapted for communicating with the reservoir, one of the valves being in communication with the piston chamber at one side of the piston and the other being in communication with the piston chamber at the other side of the piston, said valves being arranged to preclude passage of fluid from the piston chamber to the reservoir but to yield and open by suction of the piston to permit passage thereof from the reservoir to the piston chamber to compensate for fluid leakage from the piston chamber, a fluid return groove in the bearing and communicating with the reservoir for returning leakage about the piston shaft, passage means capable of fixed adjustment as to capacity and normally serving to convey fluid from one side of the piston to the other upon movement of the piston, and a check valve in each of said passage means precluding fluid flow in one direction.

6. In a device of the class described the combination of a movable piston having a shaft and a divided housing for the piston providing a reservoir and a piston chamber in which the piston may move, the piston serving to divide the piston chamber, a bearing in the housing, a pair of normally yieldingly seated valves each communicating with the reservoir, one of the valves being in communication with the piston chamber at one side of the piston and the other being in communication with the piston chamber at the other side of the piston, said valves being arranged to preclude passage of fluid from the piston chamber to the reservoir but to permit passage thereof from the reservoir to the piston chamber, a fluid return groove in the bearing and communicating with the reservoir for returning leakage about the piston shaft, a one-way passage means for the conveyance of fluid from one side of the piston to the other, and a second one-way passage means entirely independent of the first one-way passage means, for conveying fluid, in the opposite direction, from one side of the piston to the other, and a ball check valve in each of said passage means precluding fluid flow in one direction.

7. A base plate for shock absorbers comprising means for attachment to a supporting surface, said base plate having a flat face, and a pair of substantially parallel bores extending diametrally of the base plate, each of said bores being provided with an inlet and an outlet port, a needle valve for varying the capacity of the bore, and a fluid check means precluding fluid flow in one direction only.

8. In a device of the class described the combination of a movable piston and a divided housing therefor providing a reservoir and a piston chamber in which the piston may move, the piston serving to divide the piston chamber, a base plate and means for attachment thereof to the housing, a pair of fluid replenishing valves each normally yieldingly seated and adapted for communicating with the reservoir, one of the valves being in communication with the piston chamber at one side of the piston and the other being in communication with the piston chamber at the other side of the piston, said valves being arranged to preclude passage of fluid from the piston chamber to the reservoir but to yield and open by suction of the piston to permit passage of small amounts of fluid from the reservoir to the piston chamber to compensate for fluid leakage from the piston chamber, and independent passage means provided in the base plate and communicating with the interior of the housing, said passage means each normally serving to convey fluid from one side of the piston to the other upon movement of the piston, the passages each including a check valve and a valve for fixed adjustment.

9. In a device of the class described the combination of a movable piston and a divided housing therefor providing a reservoir and a piston chamber in which the piston may move, the piston serving to divide the piston chamber, a base plate and means for attachment thereof to the housing, a pair of fluid replenishing valves each normally yieldingly seated and adapted for communicating with the reservoir, one of the valves being in communication with the piston chamber at one side of the piston and the other being in communication with the piston chamber at the other side of the piston, said valves being arranged to preclude passage of fluid from the piston chamber to the reservoir but to yield and open by suction of the piston to permit passage of small amounts of fluid from the reservoir to the piston chamber, a one way passage means in the base plate and communicating with the interior of the housing, for the conveyance of fluid from one side of the piston to the other, and a second one way passage means in the base plate and entirely independent of the first one way passage means, for conveying fluid in the opposite direction, from one side of the piston to the other, the passages each including a check valve and a valve for fixed adjustment.

In testimony whereof, I have hereunto subscribed my name this 26th day of August, 1930.

JOHN ECKHARD.